US011658966B2

(12) United States Patent
Yu

(10) Patent No.: US 11,658,966 B2
(45) Date of Patent: May 23, 2023

(54) PERSONNEL PROFILES AND FINGERPRINT AUTHENTICATION FOR CONFIGURATION ENGINEERING AND RUNTIME APPLICATIONS

(71) Applicant: FISHER-ROSEMOUNT SYSTEMS, INC., Round Rock, TX (US)

(72) Inventor: Dino Anton Fernandez Yu, Muntinlupa (PH)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 337 days.

(21) Appl. No.: 16/717,586

(22) Filed: Dec. 17, 2019

(65) Prior Publication Data
US 2021/0185035 A1    Jun. 17, 2021

(51) Int. Cl.
| H04L 29/06 | (2006.01) |
| H04L 9/40 | (2022.01) |
| G06F 16/2455 | (2019.01) |
| G06F 16/23 | (2019.01) |
| G06F 21/45 | (2013.01) |
| G05B 15/02 | (2006.01) |

(52) U.S. Cl.
CPC ...... H04L 63/0861 (2013.01); G06F 16/2379 (2019.01); G06F 16/2455 (2019.01); G06F 21/45 (2013.01); H04L 63/102 (2013.01); G05B 15/02 (2013.01)

(58) Field of Classification Search
CPC .............. H04L 63/102; G06F 16/2455; G06F 16/2379; G06F 21/45
See application file for complete search history.

(56) References Cited

U.S. PATENT DOCUMENTS

| 9,866,392 | B1* | 1/2018 | Campagna | H04L 9/14 |
| 10,623,958 | B2* | 4/2020 | Kremer | H04W 4/02 |
| 10,893,043 | B1* | 1/2021 | John | H04L 63/0853 |
| 11,050,570 | B1* | 6/2021 | Totah | H04L 63/0428 |
| 11,082,430 | B1* | 8/2021 | Kuo | H04L 63/20 |
| 11,227,060 | B1* | 1/2022 | John | G06F 21/606 |
| 2002/0178385 | A1* | 11/2002 | Dent | G07C 9/00309 726/27 |
| 2005/0198534 | A1* | 9/2005 | Matta | G06F 21/31 726/5 |
| 2019/0273794 | A1* | 9/2019 | Gochi Garcia | H04L 67/42 |
| 2020/0374292 | A1* | 11/2020 | Rakshit | H04L 63/1433 |
| 2021/0051148 | A1* | 2/2021 | Parikh | H04L 67/141 |
| 2021/0081546 | A1* | 3/2021 | Falk | H04W 12/128 |
| 2021/0266326 | A1* | 8/2021 | Chen | H04L 67/51 |
| 2021/0271665 | A1* | 9/2021 | Jetzfellner | H04L 9/50 |

FOREIGN PATENT DOCUMENTS

GB    2 505 783 A    3/2014

OTHER PUBLICATIONS

Search Report for Application No. GB2017780.4, dated Mar. 5, 2021.

* cited by examiner

*Primary Examiner* — Tongoc Tran
(74) *Attorney, Agent, or Firm* — Marshall, Gerstein & Borun LLP

(57) ABSTRACT

A system for validating a write command to a device in a process control system using biometric credentials and relationship attributes. A two user validation process may use biometric inputs of the two users to authenticate the two users and to query for associated profiles to determine whether the two users have a relationship required to release an intercepted write command to the device.

26 Claims, 13 Drawing Sheets

PERSONNEL PROFILES AND FINGERPRINT AUTHENTICATION FOR CONFIGURATION ENGINEERING AND RUNTIME APPLICATIONS

FIELD OF TECHNOLOGY

The present disclosure relates generally to process control systems, and, more particularly, to a process control system that validates a write command to a device of the process control system.

BACKGROUND

Process control systems used in industrial processes may include at least one host or operator workstation communicatively coupled to one or more process controllers via one or more input/output (I/O) interface devices. The process controllers may communicate with one or more field devices via analog, digital or combined analog/digital buses. The field devices, which may be, for example, valves, valve positioners, switches and transmitters/sensors (e.g., temperature, pressure and flow rate sensors), perform functions within the process plant such as opening or closing valves and measuring process parameters. The process controllers receive signals indicative of process measurements made by the field devices and/or other information pertaining to the field devices, use this information to implement control routines and then generate control signals which are sent over the buses to the field devices to control the operation of the process. As described herein, field devices, controllers, and other plant devices, such as input/output interfaces, are generally referred to as "process control devices," or "plant devices."

Security protocols in existing plant operator programs may place restrictions on access to a critical control device or to parameters of the control device. These protocols may be required to ensure a modification is intended and that the modification is correctly entered. In some systems, critical parameters or devices may be marked as protected and require additional security processing. Generally, existing process control systems may use standard username and password credentials for authentication and validation. These types of authentication and validation protocols may be prone to abuse by staff due to laxness or prone to attack by sabotage. For example, usernames may generally be discovered via network directories and passwords may be guessed or hacked. In some situations, user credentials may be intentionally shared between coworkers to expedite change requests even though sharing of credentials is against organization rules.

Some systems may use a second user verification for certain critical parameter changes. Generally these systems may require a second user from a different user group or role (e.g., with different permissions) as a first user initiating the parameter change before the change is allowed. While this additional verification or validation step may increase security for some modifications, the manner in which the additional verification step is implemented may include vulnerabilities. For example, anyone having a high ranking role password (e.g., containing many permissions) may be able to approve modifications. In combination with weaknesses in standard username and password credentials, these systems may still be vulnerable to lax operational conduct and to external hacking or attacks.

SUMMARY

The present disclosure describes a process control system including at least one controller and one field device, where write commands intended for a process control device are intercepted for a validation process. The validation process may include determining a relationship between a first user initiating the write command and a second user verifying the write command. The second user may be prompted to validate the write command of the first user by submitting a biometric input that may be authenticated based on a user profile of the second user. If the second user is biometrically authenticated, the write command may be released for execution on the process control device.

In an embodiment, when the write command is intercepted, a biometric input of a first and second user may be received. User profiles of the first and second users may be queried based on the biometric inputs of the first and second user. If the user profiles are found, the method and system may search for a relationship between the first and second users based on their profiles. If the relationship exists and/or is valid, the write command may be released.

DETAILED DESCRIPTION

Figure 1:
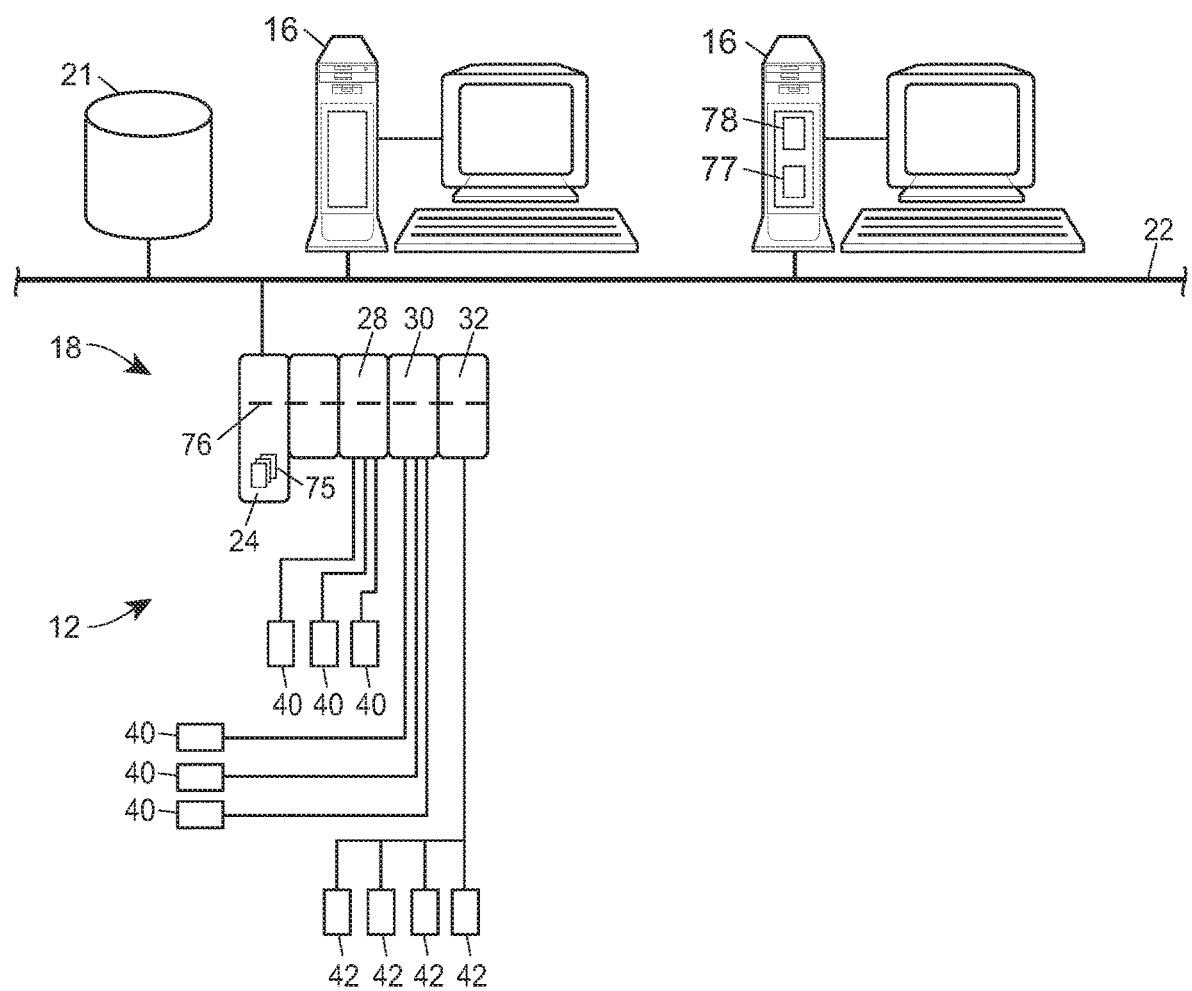
FIG. 1 illustrates a portion of a process control system that includes a workstation, an input/output (I/O) interface device, a process controller, and one or more field devices.

FIG. 1 illustrates a process control system 12 in a process plant 10. More particularly, process control system 12 may represent a distributed process control system or DCS. The process plant 10 also includes one or more host workstations, computers or user interfaces 16 (which may be any type of personal computers, workstations, etc.) that are accessible by plant personnel, such as process control operators, maintenance personnel, configuration engineers, etc. In the example illustrated in FIG. 1, a user interface 16 is shown as being connected to a process control node 18 and to a configuration database 21 via a common communication line or bus 22. The communication network 22 may be implemented using any desired bus-based or non-bus based hardware, using any desired hardwired or wireless communication structure and using any desired or suitable communication protocol, such as an Ethernet protocol.

Generally speaking, node 18 of the process plant 10 includes process control system devices connected together via a bus structure that may be provided on a backplane 76 into which the different devices are attached. The node 18 (which may represent a plurality of nodes) is illustrated in FIG. 1 as including a process controller 24 (which may represent multiple controllers) as well as one or more process control system input/output (I/O) devices 28, 30 and 32. Each of the process control system I/O devices 28, 30, and 32 is communicatively connected to a set of process control related field devices, illustrated in FIG. 1 as field devices 40 and 42. The workstation 16, process controller 24, the I/O devices 28-32 and the controller field devices 40 and 42 generally make up the distributed process control system (DCS) 12 of FIG. 1.

The process controller 24, which may be, by way of example only, DeltaV™ controllers sold by Emerson Process Management or any other desired type of process controllers, are programmed to provide process control functionality (using what are commonly referred to as control modules) using the I/O devices 28, 30 and 32, and the field devices 40 and 42. In particular, controller 24 implements or oversees one or more process control routines 75 (also referred to a control modules) stored therein or otherwise associated therewith and communicates with the field devices 40 and 42 and the workstations 16 to control the process 10 or a portion of the process 10 in any desired manner. The field devices 40 and 42 may be any desired types of field devices, such as sensors, valves, transmitters, positioners, etc., and may conform to any desired open, proprietary or other communication or programming protocol including, for example, the HART or the 4-20 ma protocol (as illustrated for the field devices 40), any fieldbus protocol such as the Foundation® Fieldbus protocol (as illustrated for the field devices 42), or the CAN, Profibus, the AS-Interface protocols, to name but a few. Similarly, the I/O devices 28-32 may be any known types of process control I/O devices using any appropriate communication protocol(s). A common backplane 76 (indicated by a dotted line through the controller 24 and the I/O devices 28-36) is used in each of the nodes 18 to connect the controller 24 to the process control I/O cards 28, 30 and 32. The controller 24 is also communicatively coupled to, and operates as a bus arbitrator for the bus 22, to enable each of the I/O devices 28-32 to communicate with any of the workstations 16 via the bus 22.

FIG. 1 illustrates that multiple workstations 16 may be coupled to the DCS. The workstations may be programmed to execute standard operator control applications 77, 78 for running the plant. These standard operator control applications may be considered as part of the DCS 12 as they may be required to control and manipulate a plant process using field devices. For example, the control applications 77, 78 may be used to read from, write to, or otherwise access a process control device such as a controller or field device. The operator may be responsible for monitoring process variables by reading parameter values and adjusting parameters of a controller or field device accordingly. In some situations, an operator may adjust a set point of a controller when various process variables indicate a particular condition. Standard operator control applications may be used to perform these procedures.

Figure 2:
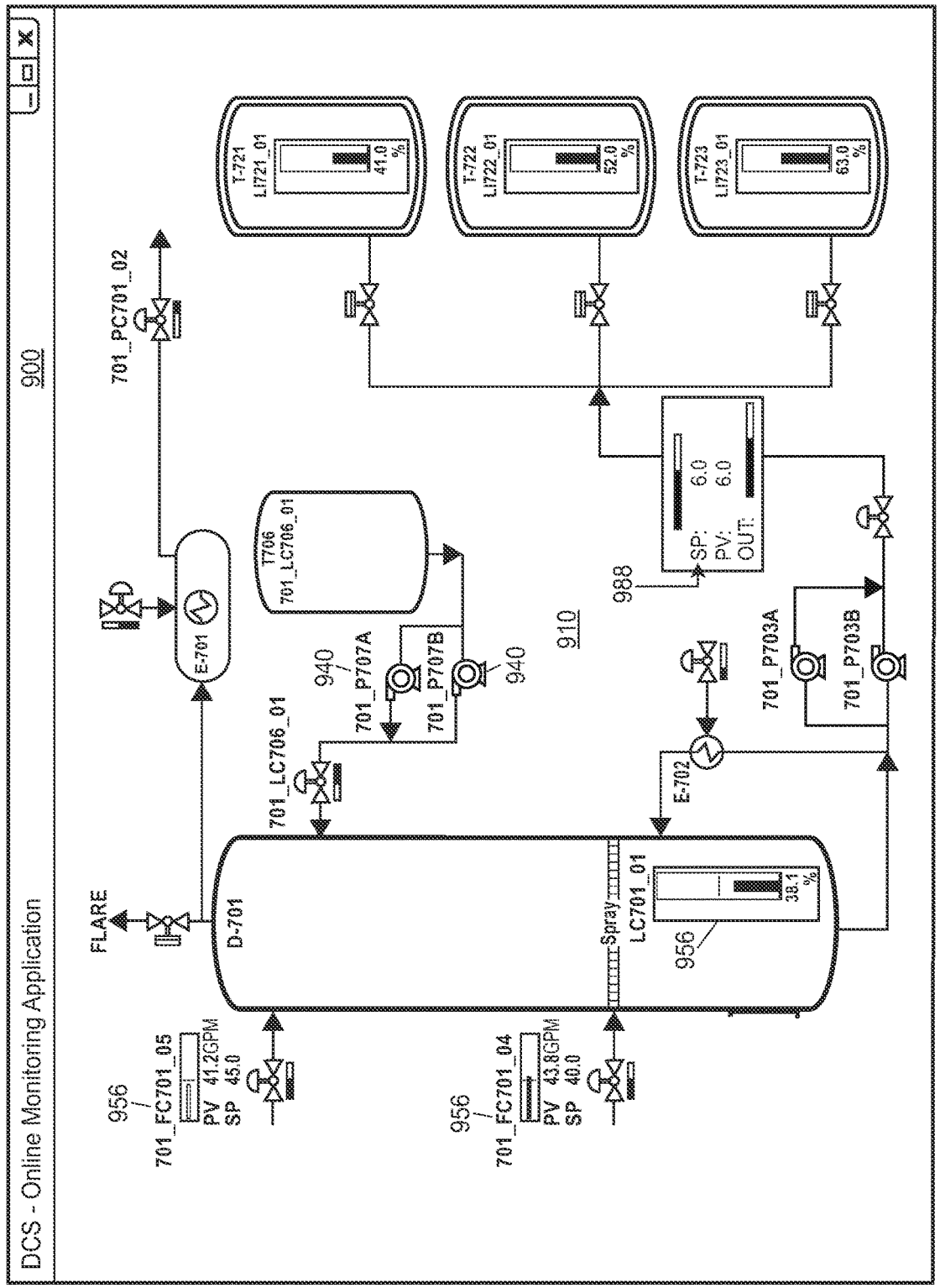
FIG. 2 illustrates an example graphical user interface (GUI) of a plant operator control application that may be executed on one or more of the workstations of FIG. 1 for monitoring plant devices and adjusting plant parameters.
Figure 4A:
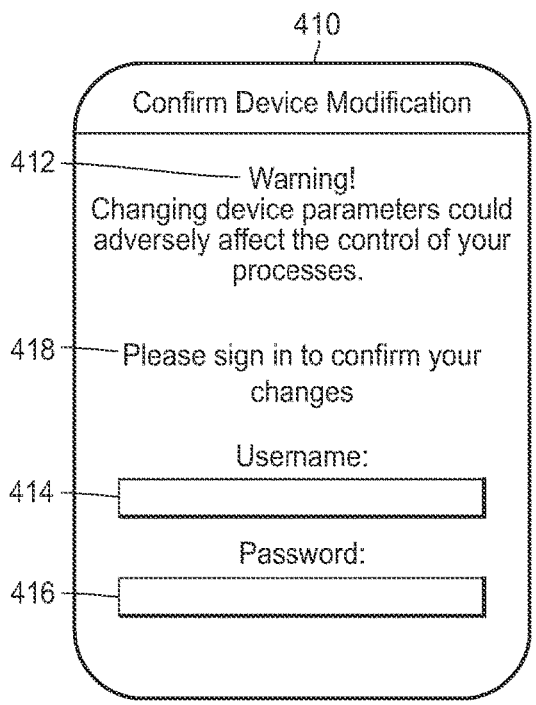
FIG. 4A illustrates a single user warning screen and request for confirmation for modifying a protected device or protected parameter of a device.

FIG. 2 illustrates a possible operator control application graphical user interface (GUI) 900 showing a dashboard view of a portion of a process within a plant and with an overlay of a distributed control system. FIG. 2 illustrates a graphical representation of a portion of a process plant 910, being managed by a DCS application and shows one or more field devices 940 positioned around activities within a plant. This GUI 900 may represent an aspect of an operator control application of a DCS, such as Delta V™ Operate sold by Emerson Process Management, being run on any one or more of the workstations 16 of FIG. 1. Generally, an operator may use GUI 900 to monitor a plant process and coordinate and schedule plant devices (e.g., the controllers and field devices) by communications via a set of input output I/O devices or interfaces. GUI 900 may illustrate a dashboard view or bird's-eye view of the plant and process where an operator can monitor key parameters 956 around and about the plant 910 with an ability to retrieve more detailed information on any particular section or device. During normal operation of the plant this screen may be interrupted with an alert message or prompt when a user attempts to change a parameter of a process control device, such as illustrated in FIG. 4A (to be discussed further below).

Figure 3:
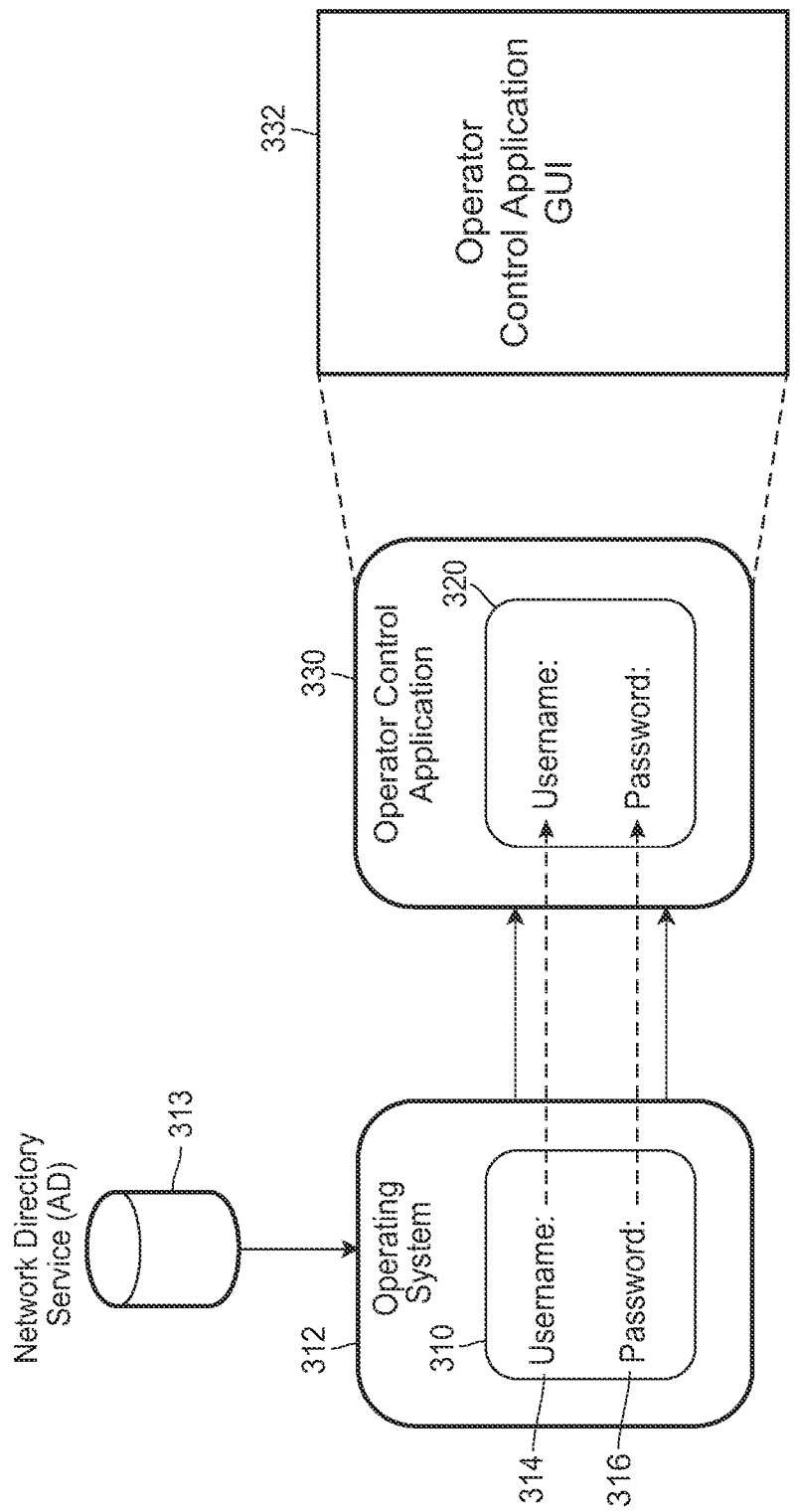
FIG. 3 illustrates a general security login process to access a GUI of a plant operator application, such as illustrated in FIG. 2.

FIG. 3 illustrates a security process of an operator control application that may be running on a distributed process control system (DCS) such as that illustrated in FIG. 2. In some workstation applications, an authentication service 310 of a computing device's operating system 312 may be used in conjunction with an authentication function 320 of the application 330. For example, a user may first log in to a computing device by inputting a username 314 and password 316. In process control systems running an operator control application 330, the operator control application 330 may leverage operating system login credentials 314, 316 to concurrently log in to the operator control application authentication function 320 by using the same credentials 314, 316. An example may be a login to a process control system workstation running a Windows operating system. Logging in to the workstation's Windows environment 312 may also be used to login to the operator control application 330. In this situation, a network directory service, such as Microsoft Active Directory (AD) 313, may be used to manage a user's credentials (to be further discussed below). Once an operator is logged into both the local workstation operating system 312 and the operator control program 330, the operator may have access to a GUI 332 similar to that illustrated in FIG. 2 as a main portal to the operator's duties and work functions.

As discussed above, an operator may monitor a process within the plant using the GUI of FIG. 2. At certain times, the operator may decide to access a process control device such as a controller 24 or field device 40 by clicking on a process depicted by the GUI 900 and change, for example, a set point 988. In some systems, a change or write command to a process control device, such as a process controller 24 or field device 40, may have security restrictions in place. Some of these restrictions may be in place to ensure accuracy of a modification. For example, plant operators may be encouraged to double check their inputs for parameter changes before committing a write command to modify a process control device. Some process control system programs may display a warning prompt to a user requesting user credentials after the user attempts to initiate, send, or otherwise execute a write command to a process control device. FIG. 4A illustrates an example warning screen 410 that may be displayed when the operator application intercepts a modification attempt to a process control device. The warning screen 410 may display a warning 412 about possible adverse effects of a change to the device and require the user to sign in with a username 414 and password 416 to confirm the changes. The user credentials 414 and 416 may be used in this situation to confirm the identity of the user issuing the write command. In systems that leverage a network directory service such as Active Directory, the login credentials 414 and 416 may generally be the same as the one a user uses to sign into a workstation 16.

In an embodiment, the warning prompt may display a simple question or statement 418 requesting the user to confirm that the parameter changes are accurate. The user credentials 414 and 416 may also be used to check whether a user has authority to make changes to the process control device. This may be the case with more critical parameters of a process control device. For example, changing a set point to a process controller that is commissioned and online may require a security check to determine if the user is allowed to make changes to the process controller. In some systems, critical parameters or devices may be marked as protected and require additional security. For example, a process control system may require authentication of the user to ensure that the user whose credentials are being used to modify the process control device is actually that user.

In some existing systems, a single warning prompt such as illustrated in FIG. 4A may be the only required check before executing a device parameter modification. In this case, a write attempt to a process control device to change a process parameter may simply require a user to confirm that the change command is intended and correctly submitted by entering or re-entering user authentication information, such as a username 414 and password 416. The first user initiating the change command may be called a confirmer.

Figure 4B:
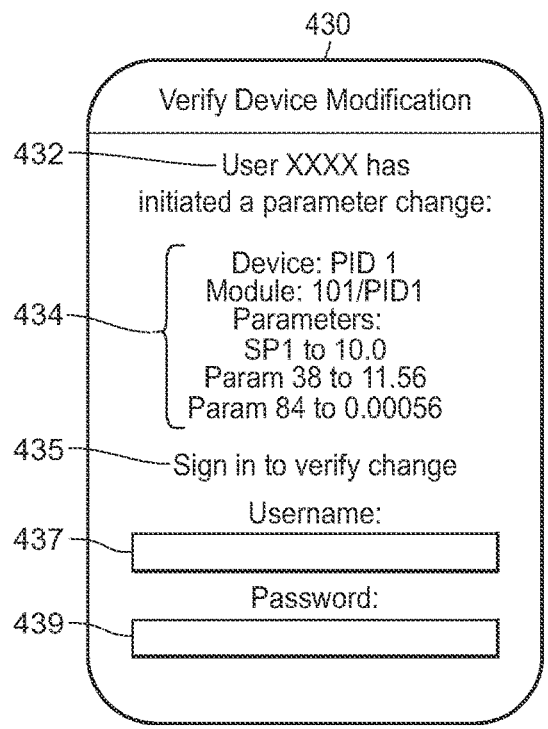
FIG. 4B illustrates a possible verification screen for a second user to validate or verify a change request.
Figure 4C:
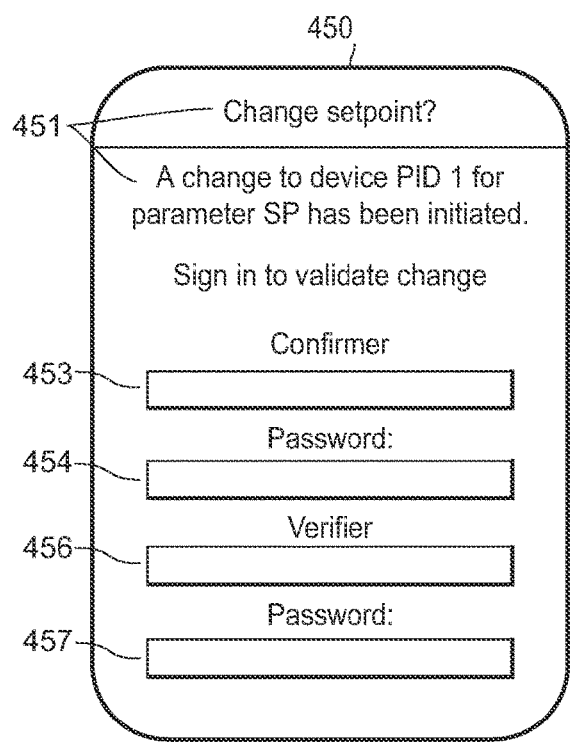
FIG. 4C illustrates a possible two user validation screen for receiving authentication information to approve a modification to a process control device.

In some systems a two user validation system may be implemented where, the confirmer authentication and validation is insufficient to release the write command for execution. In these systems, a write command may require an additional authentication from a second user such as a user having a particular group affiliation or role affiliation. For example, in a process plant where an operator may be a confirmer, a user in a supervisor group (where supervisors have higher rank than operators and consequently a greater permission set) may need to authenticate themselves in addition to a confirmer before the write command is allowed to modify a process control device. FIG. 4B illustrates a second login prompt 430 for a verifier to confirm the changes of a confirmer. The verifier prompt 430 may include an identifier of the confirmer or first user initiating the write command 432, a listing of device parameters to be modified 434, and a statement or prompt to sign in to validate the write command 435. An input box for username 437 and password 439 may be provided so that user can enter credentials. In an embodiment, an operator may be a confirmer or an initiator of the command while the supervisor is a verifier of the write command. As discussed above, sharing of login credentials may be one way to defeat this validation and security process. FIG. 4C illustrates a security or warning prompt 450 indicating an intercepted write command to change a set point 451 with input boxes for both a confirmer username 453 and password 454 and verifier username 456 and password 457 in one screen.

In some process control device networks, a network directory service such as Microsoft Active Directory (AD) may be used to control access to a broad set of applications and systems within an organization's network. In particular, for process control plants running Microsoft Windows as their primary operating system on network workstations, AD may be the authoritative user directory that governs access to most services such as email, file sharing, and in some process control networks, operator control applications and engineering applications that have access to plant devices.

Figure 5A:
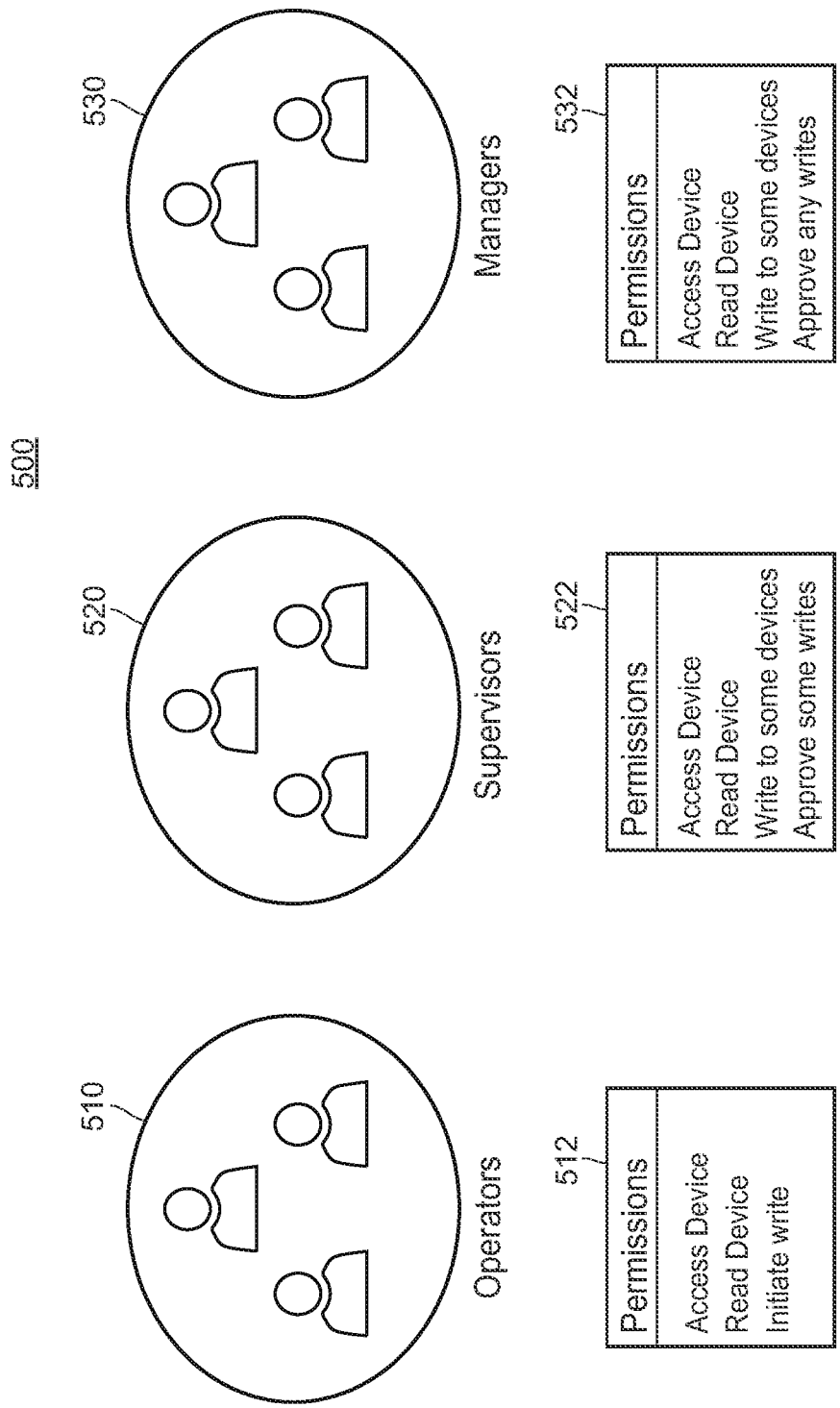
FIG. 5A illustrates an example model of groups, roles, and privileges as used in a network directory service for use in a security protocol.

FIG. 5A illustrates an organization structure 500 captured by a network directory service such as Active Directory by Microsoft. In an Active Directory like model, a system administrator may set up an account for a user and assign a role or privilege set to the user. A role in this model may also be referred to as a group, as multiple persons with the same role may have the same set of privileges or permissions to access a resource such as a machine or other computing device (e.g., a process control device) as well as to perform activities on the resource such as a read or a write function on the machine. As shown in FIG. 5A, 3 roles or groups are defined: operators 510, supervisors 520, and project managers 530. Each group has a set of privileges or permissions 512, 522, 532. In this particular example, supervisors 520 have a higher rank than operators 510 and project managers 530 have a higher rank than supervisors 520. Higher ranking users in this model have a greater permission set. For example, the permission set 522 is greater than the permission set 512 (e.g., has more permissions) and the permission set 532 is greater than the permission set 522.

In some systems that leverage AD to manage user credentials, two user validation may involve an operator control application determining that the first user does not have permission to make the write command based on the user's group in the active directory. For example, in FIG. 5A operators 510 can initiate a write command based on their permissions 512 but only supervisors and 520 managers 530 have write permissions 522 and 532. When an application determines that a role (e.g., operator) does not have write permissions, it may then require a role that does have the write command permission (e.g., supervisor or manager). Consequently, the operator control application may then display a warning prompt for a second user to verify the write command such as illustrated in FIG. 4B or 4C. This second warning or authentication prompt 430 or 450 may be for a user having a role with the required write permission for the process control device. In existing systems, the operator workstation application may simply require that any one of the users signing in have a write permission to the process control device. In some cases where both the first and the second user have write permissions, the security process may be redundant. This may be the case when the first and second user are the same user but the system defaults to requiring two user validation. A potential problem with this security is when neither the first user nor the second user has oversight over a particular process currently using the process control device, but both users have privileges to write to the device because of an AD like model.

As discussed above, problems may exist with an active directory model for managing user credentials when applied to an operator control application for a process control system. While the organization of FIG. 5A may be adequate for generic computing resources for which Active Directory may be designed for, it may not be particularly suited for process control devices in a process control system that require more specific monitoring activity by specific users and between specific users. Also, the modeling of permissions and privileges to roles in an active directory model may not be suited to capture direct operator relationships that are critical to managing equipment in a process plant and providing appropriate security.

In the process control industry, relationships between users such as supervisors and operators may be an important factor in monitoring and managing activities or processes. Users may have the same general set of privileges as defined in an active directory model similar to that illustrated in FIG. 5A but have different responsibilities based on process or subprocess within a plant that are not captured with a generic role description. For example, a group of supervisors may all have the same permissions to a process control device, but a supervisor's responsibility for a process control device may be distinguished based on subordinates that report directly to the supervisor and based on a process assigned to the subordinate. In some situations, a supervisor may not be concerned with certain devices that are outside the supervisor's scope of responsibility, yet they may still be a part of an AD group having permission to validate write commands to the device. Consequently, a danger exists in providing supervisors with blanket write authorization based on roles alone. It should be noted that while the use of AD has been described herein, other network directory services may operate in the same manner using a similar if not identical user organization model based on privileges or permissions. The same flaws described of AD may also applicable to these other systems.

As discussed above with respect to FIG. 5A, the active directory model shows that supervisors 520 may have similar access and authority to endorse write commands in an AD based system. A role 520 that includes multiple supervisors would allow every supervisor in the group 520 the same set of write permissions. However, in process plants, the validation of a particular write command for a particular device may require a user with situational knowledge specific to a process of the device, where the verifying user may be involved in a direct relationship with the user initiating a modification. This direct relationship may not be captured by existing security protocols relying on AD based user roles. The problem becomes more extensive as a distributed process control system (DCS) may have multiple different areas and/or sub processes assigned to different teams where each team may have a different direct report supervisor. Based on an AD model, a supervisor role may grant access to multiple supervisors for the same set of devices even though different supervisors are responsible for different sets of people working on different aspects (processes) of the devices.

Figure 5B:
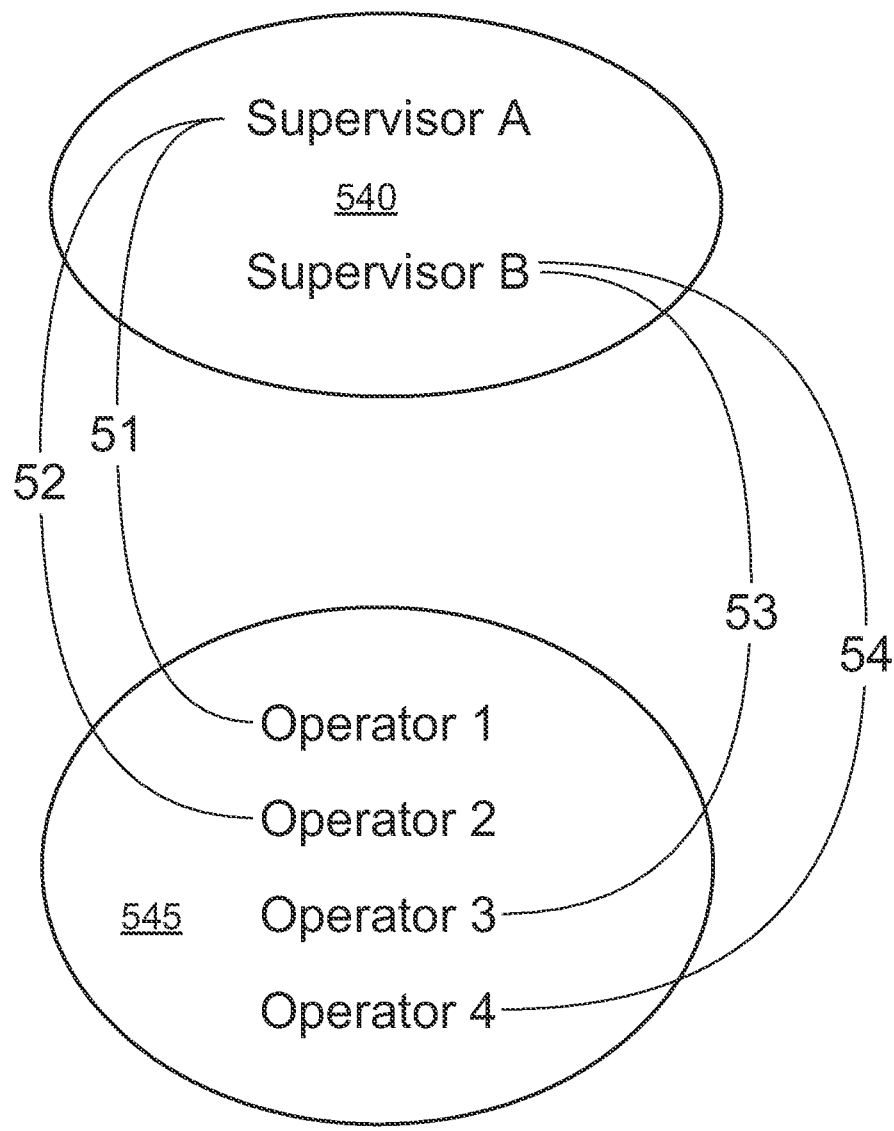
FIG. 5B illustrates a diagram of direct relationships between users in different roles according to an embodiment.

FIG. 5B illustrates a possible direct relationship configuration. A supervisor group 540 includes Supervisor A and Supervisor B. An operator group 545 includes Operator 1, Operator 2, Operator 3, and Operator 4. Operator 1 and Operator 2 may directly report to a Supervisor A and form a first team. Operator 3 and Operator 4 may directly report to Supervisor B and form a second team. Some of the process control devices in a plant may be modified at different times or for different aspects of a process based on which team is making a parameter changes to the device. With AD implementations, all supervisors in the supervisor group 545 may have the same set of privileges or permissions to verify or validate a write command even though a supervisor can be on a different team and validate a write command for a matter unrelated to another supervisor's team. For example, Operator 2 may initiate a write command based on situations that are the responsibility of the first team and for which Supervisor A should be aware of. With current AD implementations any supervisor 540 may use their credentials to authorize the write command for any operator 545. In some circumstances, theft of a supervisor password can be used in a malicious way to affect an entire plant as defined by an active directory privilege list. Because the groups/roles and privileges based system of an active directory system does not take into account relationship definitions, AD models may be limited to simply checking group affiliation and privilege based on group affiliation. So even though some existing systems use two user authentication, inherent problems may exist for providing access to a process control device (e.g., redundancy and password sharing).

Figure 5C:
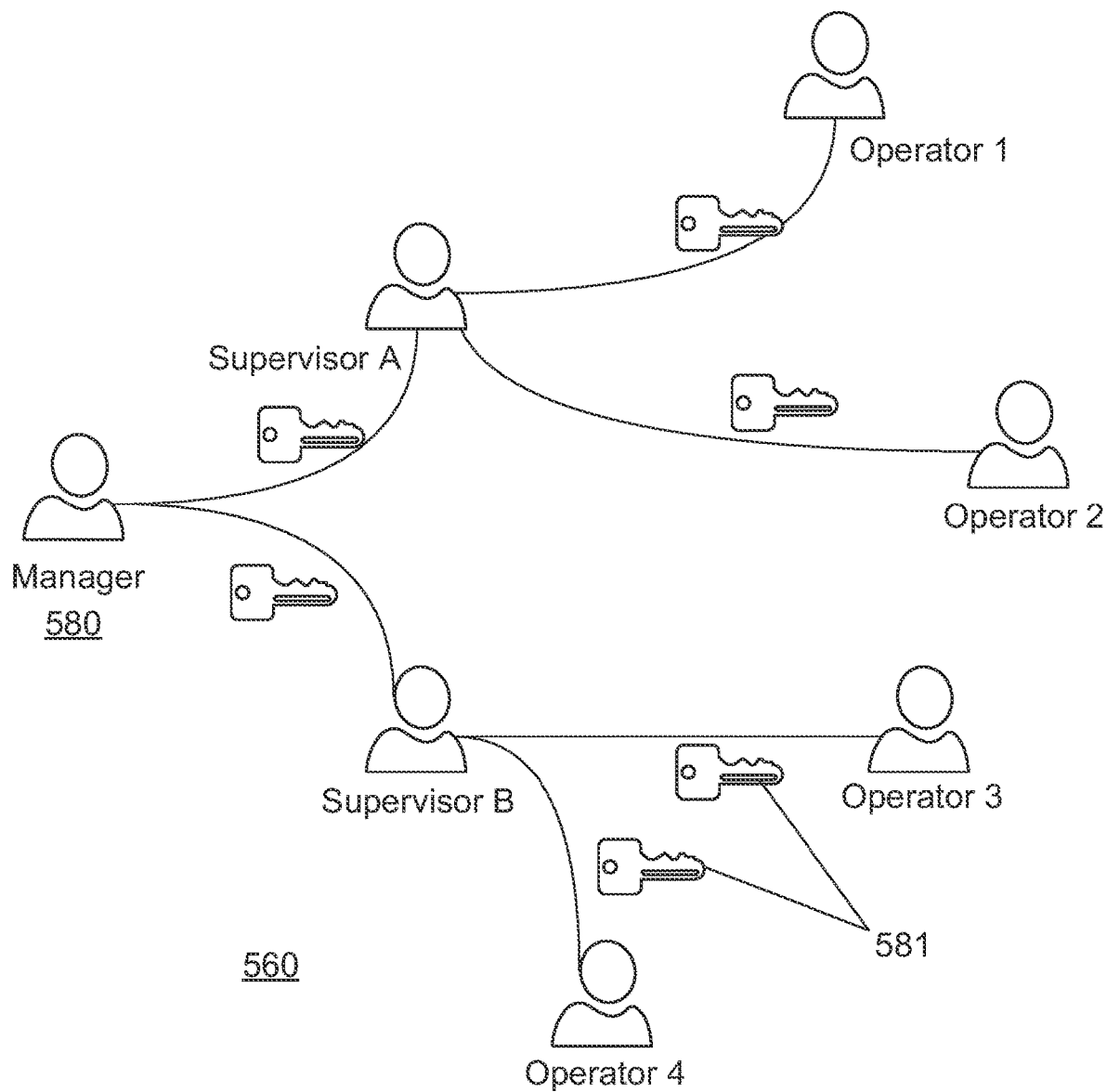
FIG. 5C illustrates a relationship diagram with multiple levels that can be used in an embodiment of a security process including biometric inputs to authenticate relationships.

In FIG. 5B, links 51-54 represent relationships between users that are not captured by the active directory model. These relationships 51-54 may be between a superior and a subordinate (operator). Even within groups defined by rank, individual direct relationships can be captured. With respect to the set of operators 1-4 and supervisors A and B, this relationship graph is able to directly connect two individual users, regardless of role or rank. FIG. 5C illustrates a broader relationship graph 560 that shows the set of direct connections between users of FIG. 5B. FIG. 5C also illustrates that more than two levels of interconnections are possible. In some embodiments, a third role 580 may be a project manager (PM). A project manager 580 may have a higher rank than supervisors 540 and have a corresponding larger set of permissions. In an embodiment, the direct relationships may be implemented using a relationship identifier within a profile set. Moreover, to address and reduce loopholes associated with typical username and password configurations, biometric input of users may be used for authentication. In combination with a profile that includes relationship information, authentication of a user may also include authentication of a user profile and the attributes of the user profile, including relationship links. The keys 581 in illustrated in FIG. 5C may indicate that a relationship is biometrically authenticated.

Figure 6:
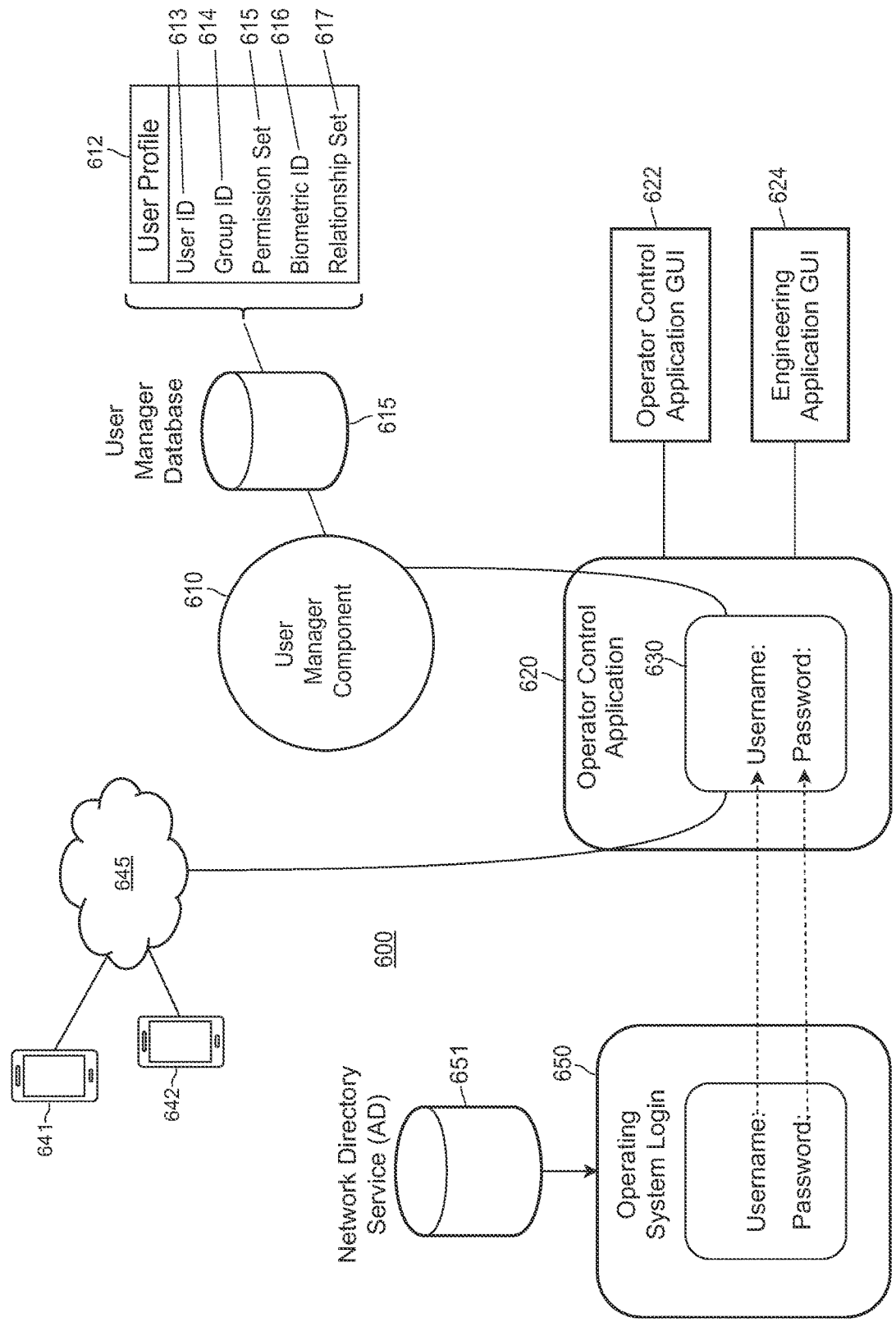
FIG. 6 illustrates a system for providing a validation system that includes biometric and relationship based security.

FIG. 6 illustrates a system 600 to implement a security protocol that takes into account direct assignments and uses biometric identifiers to validate relationships supporting those assignments. A user manager component 610 may manage a set of profiles 612 for a DCS workstation application 620, such as an operator control application 622 or an engineering application 624 that configures and install control modules. It should be noted that a DCS workstation application 620 may have different components such as an operator control application, an engineer application, or a system administrator application. It should be noted that while FIG. 6 is described with respect to an operator application 622, many different DCS related applications may be running on the same or different machines.

The user manager component 610 may manage a set of user profiles 612. In an embodiment, the user manager component may be adapted to store and a retrieve a set of user profiles. The user profiles 612 may include the following attributes: a user identifier 613, a group identifier 614, a set of permissions 615, a biometric identifier 616, and at least one relationship identifier in a relationship set 617. In an embodiment, the user manager component 610 may include a database 615, an electronic table, or an equivalent data storage component that is adapted to store and/or retrieve the set of user profiles 612. The user manager 610 may be adapted to receive request for profiles 612 based on any of the attributes and return the corresponding profile. In an embodiment, the user manager component 610 may be a relational database management system.

A security and validation component (SVC) 630 may be communicatively coupled to the user manager component 610 to implement a process of validating and/or authorizing a write command to a process control device as described herein. In an embodiment, any of the DCS applications 620 may be communicatively coupled to the user manager component 610 and the security and validation component 630 to enforce the security protocol. The security and validation component 630 may intercept a write command or modification attempt from one or more workstation applications, such as an operator control application. The write command may be intended for one or more process control devices. The write command may be intercepted in a number of manners to be further described below. The security and validation component 630 may then apply a security process before releasing the intercepted write command if the security and validation process is successful or terminate the write command if the security and validation process fails. In an embodiment, the security and validation component 630 may be part of a DCS operator control application 622. In an embodiment, the security and validation component 630 may be an independently running application on a network server device or workstation. For example, the SVC 630 may monitor network traffic for write commands at a server and intercept those commands before they can reach a process control device for commitment or execution. In an embodiment, the SVC 630 may run on a gateway computing device where commands from operator workstations must pass before being routed to communication buses that connect I/O interfaces to controllers and field devices. In a DCS that has multiple workstations that are located in different physical areas within a plant, the SVC 630 may execute on a server that is communicatively coupled to the workstations and provides the described security protocol for all workstations.

In an embodiment, mobile computing devices 641 and 642, such as tablets and mobile phones, may connect through a wide area network 645 or through an external Internet connection where the SVC 630 may provide the security protocol for write commands before any write commands can be further communicated to a control device protocol level. In an embodiment, an operator application running on a workstation using a computer operating system 650 and utilizing an AD 650 may be modified to use the SVC 630. In an embodiment, AD 651 user information may be integrated into a user manager table of database 615 to include biometric parameters and relationship identifiers. In an embodiment, the user manager database 615 may be created by joining tables in an AD database 651 with additional parameter information as described herein. In an embodiment, general security measures already implemented by AD for a workstation's Windows login 651 may be preserved while the SVC 630 provides additional protocols on top of the general AD provided security.

Generally, the described system of FIG. 6 may be used to implement relationship definitions into user profiles 612 to enforce stricter compliance with direct assignments and increase security through the use of biometric identifiers to validate relationships. The relationships may be defined by using a relationship identifier in the relationship set. In an embodiment, the relationship identifier can be a user identifier of another user. In an embodiment, the relationship identifier can be a biometric identifier of another user.

As described further below, where warranted, a two user authentication and validation procedure may be enforced and initiated by the SVC 630. A biometric input can be used to authenticate a user and a user's associated profile parameters which includes at least one relationship as indicated by the relationship identifier attribute of the profile. A first user authentication confirming a write command may then be followed by a second user authentication request based on the first user's relationship identifier, as contained in the first user's profile. In some embodiments, authentication of the first user may include a two factor authentication where the user is requested to input an identifier of the user's direct supervisor.

Figure 7:
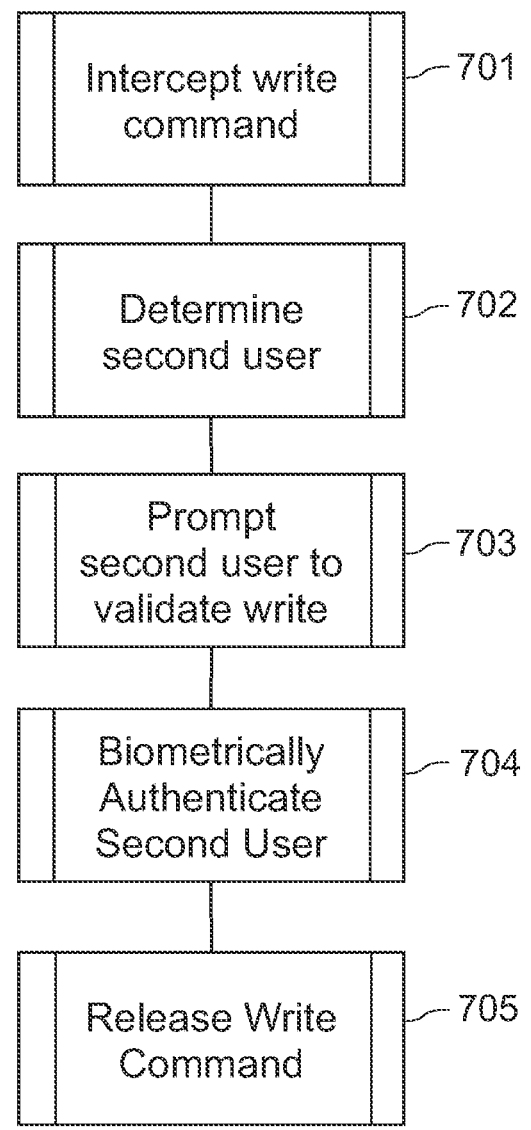
FIG. 7 illustrates a process for using biometric inputs to authenticate a user and to determine a relation to another user for validation according to an embodiment.

FIG. 7 illustrates a process for using relationship definitions and biometric signatures to increase a level of accuracy in authenticating a user and making security measures more relevant to an organization by capturing assignments of responsibility. At block 701, a write command to a process control device may be intercepted. The write command may be intended for a critical process control device that is protected. Certain critical processes in a process control system may be singled out for higher level protection and security. These processes may include a set of process control devices involved in managing the critical process. The critical devices or equipment may be given a protected attribute indicating that additional security, authorization, and/or validation processes may be required to write to, read from, or otherwise access that process control device. In some embodiments, individual parameters or sets of parameters of a process control device may be protected while some sets of parameters are not. In these embodiments, a parameter of the device may be protected while the device itself is not. In some embodiments, the protected attribute may identify that a type of relationship is necessary to access or write to the protected parameter. For example, the protected attribute may require a two user authentication/validation with an operator-supervisor relationship between the two users.

Figure 8:
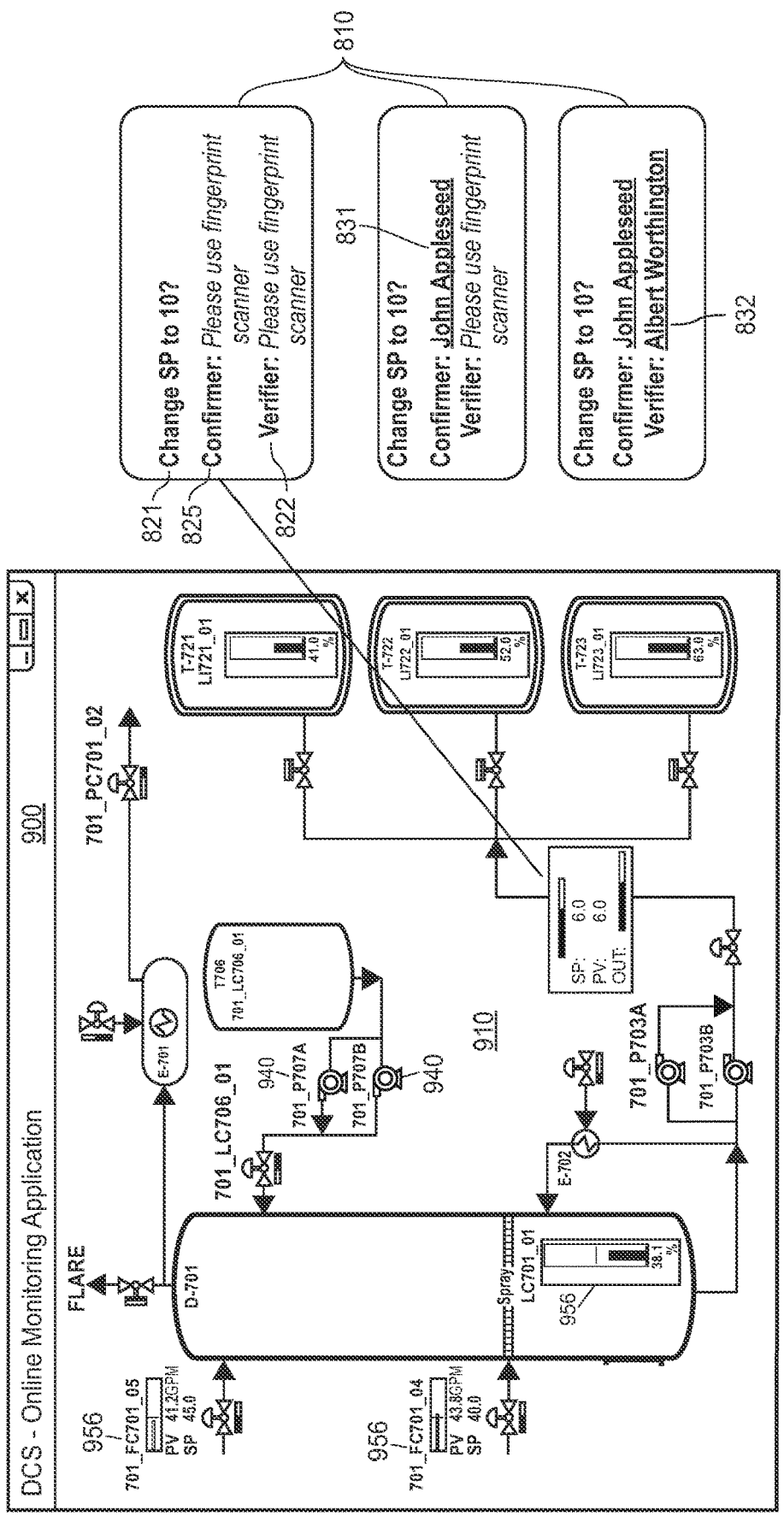
FIG. 8 illustrates a user interface for two user validation of a write command in an operator control program.

At block, 701, the intercepted write command may be a command initiated by a first user by, for example, clicking on one of the devices illustrated in FIG. 2 that is assigned a protected attribute. FIG. 8 illustrates possible prompts 810 in accordance with an embodiment showing an intercepted write command or modification attempt. It should be noted that the described method is not limited to GUI based initiation of change commands, write commands, or modification commands. In some embodiments, various methods may be used to initiate a device parameter value change, including a command prompt screen where a user types in modification commands or write commands. Block 701 may intercept the write command when checking whether a device is protected or a device parameter is protected. The process of checking device protection may be executed by the operator control program when querying a memory for device status or by querying a live device. Upon determining that a command is being initiated or issued by a user for the protected device or protected parameter, a DCS operator control program may be adapted to automatically intercept the write command. In an embodiment, a write command may be intercepted by a server that monitors write commands transmitted to process control devices on the network. Block 01 may intercept the write command by, for example, holding or suspending those commands pending an approval or validation process. Holding or suspending the intercepted commands may involve placing them in a cache or wait queue until a determination is made from the security process.

Block 701 may also determine that a relationship security protocol is in place for the protected process or protected set of parameters. Some protected devices or parameters of devices may indicate that a relationship is required to write to the device. This may indicate that at least a two user authentication and validation process is required. In some embodiments, a user may have multiple direct relationships with different ranked users, where the protected attribute may include information as to the type of relationship between two users for a write command to be released. In an embodiment, the required relationships may be managed by the SVC 630 based on information provided by the user manager component 610. Because the relationship identifier(s) can be used to indicate multiple direct relationships, the protected attribute may indicate a type of relationship (e.g., operator to supervisor relationship) required for validation of a write command.

Block 702 may determine a second user that has a relationship to the first user as defined by a relationship identifier of the first user. In an embodiment, block 702 may query for a profile of a second user based on a relationship identifier of the first user that initiated the write command. In an embodiment, the first user may have a profile where one of the attributes includes a relationship identifier that indicates a relationship with another user. A user may have one or more relationship identifiers. The number of relationship identifiers may be based on a type of relationship being captured by the security protocol or may be based on an organizational hierarchy or structure.

In an embodiment, determining a second user may include querying a user manager component that provides user profiles based on an inputted relationship identifier. In an embodiment, the relationship identifier of a profile of the first user may be a user identifier of the second user as contained in the user profile of the second user. In an embodiment, the relationship identifier may be an index that references the user profile of the second user. As discussed, the user manager component 610 may include a database 615, an electronic table, or an equivalent data storage that may be adapted to store and a retrieve a set of user profiles. In an embodiment, a database 615 may be adapted to provide the functions described herein for the SVC 610. In an embodiment, a user manager database 615 or user manager component/module 610 may be adapted to receive queries for and retrieve user profiles based on the attributes listed. The biometric identifier may include, but is not limited to, fingerprint, facial, retinal, etc. information that identifiers a user.

Block 703 may prompt a user to validate the intercepted write command. In an embodiment, upon determining a second user at block 702, block 703 may transmit a prompt to the second user. In an embodiment, the second user may be remote from the first user and may be using a different workstation or other computing device than the first user. Location information of the second user may be provided by the security and validation component. In an embodiment, location information may be queried from a separate application running on a server. A current location of the second user may be stored as an attribute by the user manager component. In an embodiment, block 703 may simply cause an operator workstation program to display a prompt at the same computing device used by the first user for a second user to validate the write command. FIG. 8 may illustrate an embodiment of prompts 810 for two user validation. In an embodiment, the identity of the second user may not be indicated by the prompt. This may be done to maintain a level of security in which relationship information is not displayed to further discourage unauthorized users from attempting to gain access. In an embodiment, the prompt may simply request validation of the write command and indicate an entry field for receiving a user credential, such as a biometric fingerprint, or other biometric input. In an embodiment, the prompt may request validation of the write command issued on the same computing device or machine with a request to input biometric credentials from the first user.

Block 704 may authenticate the second user using a biometric credential or input. The biometric input may include, but is not limited to, fingerprint, facial, retinal, etc. information that identifiers a user. In an embodiment where a biometric input is used to authenticate the second user, the biometric input may represent a higher integrity of authentication than a user login and password. In particular, in biometric authentication, physical identifying markers of a human user may be used to increase the level of accuracy for identification. Biometric authentication can also be used to authenticate a relationship with a second user.

In an embodiment, a single user, such as the second user, may provide biometric input for authentication. This may be appropriate where the first user has already been authenticated to some degree by, for example, using a username and password to access the computer and where a higher ranking user such as a supervisor is ultimately responsible for the validation process. This may also be appropriate where a first user (e.g., an operator) and a second user (e.g., a supervisor) are proximally located to each other (e.g., within the same room) or using the same workstation. It should be noted that in an embodiment, authenticating a user includes authenticating a relationship of the user as captured by the relationship identifier of the user and stored by the user manager component. In this situation, trust is based on the integrity of the relationship information provided by the user manager component. A system administrator may be tasked with entering this relationship information. In an embodiment, a value may be assigned to the relationship identifier parameter(s) of a user upon activation or creation of a user account that includes creating a user profile. The SVC may automatically assign this value or a system administrator may assign the value.

In an embodiment, a relationship between first and second users can be authenticated via one or both users, where two user authentication may be more accurate and reliable than a single user authentication of the relationship. In particular, integrity of a relationship validation may be dependent on whether one or both users provide biometric input. In an embodiment, a higher degree of relationship integrity may be achieved when identities of the first and second user are displayed to both users. In this situation, by continuing with an authentication process after seeing the identity of the other user, knowledge of a relationship with the other user is implied.

It should be noted that rank is not necessarily involved in a two user validation process where relationships are defined. In an embodiment, the first user and the second user in the relationship may be the same or similar rank in terms of responsibilities and privileges. In an embodiment described further below with respect to FIG. 11, the described process may simply require two authenticated biometric credentials or signatures from a related first and second user to release the intercepted write command. In this manner, the described security process maintains integrity as two users may be accurately identified in a relationship where their signatures (via biometric authentication) have validated a write command. It should be noted that even between similar ranked operators, the requirement for biometric signatures may be an encouraging mechanism for both operators to check and be responsible for the write command or process change.

Block 705 may release the write command for execution at the process control device if there is a match between a biometric input of the second user and a biometric identifier in a profile of the second user. In situations where the validation process fails or is otherwise unsuccessful (e.g., system malfunction), the write command may be terminated.

FIG. 8 illustrates a GUI 810 for a two user validation system as described above. FIG. 8 illustrates an operator control application interface 900 similar to FIG. 2, but uses a two user prompt 810 asking for biometric information. The prompt indicates a two user authentication for a confirmer 825 and a verifier 822 for a set point change 821. In this embodiment, a confirmer name 831 is displayed to the verifier 822 once the confirmer 825 biometrically authenticates himself as the name 831 John Appleseed. In this example, the verifier 822 may see the confirmer name 831, understand that the confirmer has been authenticated, and that the write command is to change the set point for a device 821. If the verifier 822 agrees, the verifier 822 can submit a biometric input. If the verifier completes the authentication, the prompt will indicate the name of the verifier 832 and show both names of the signing parties.

Figure 9:
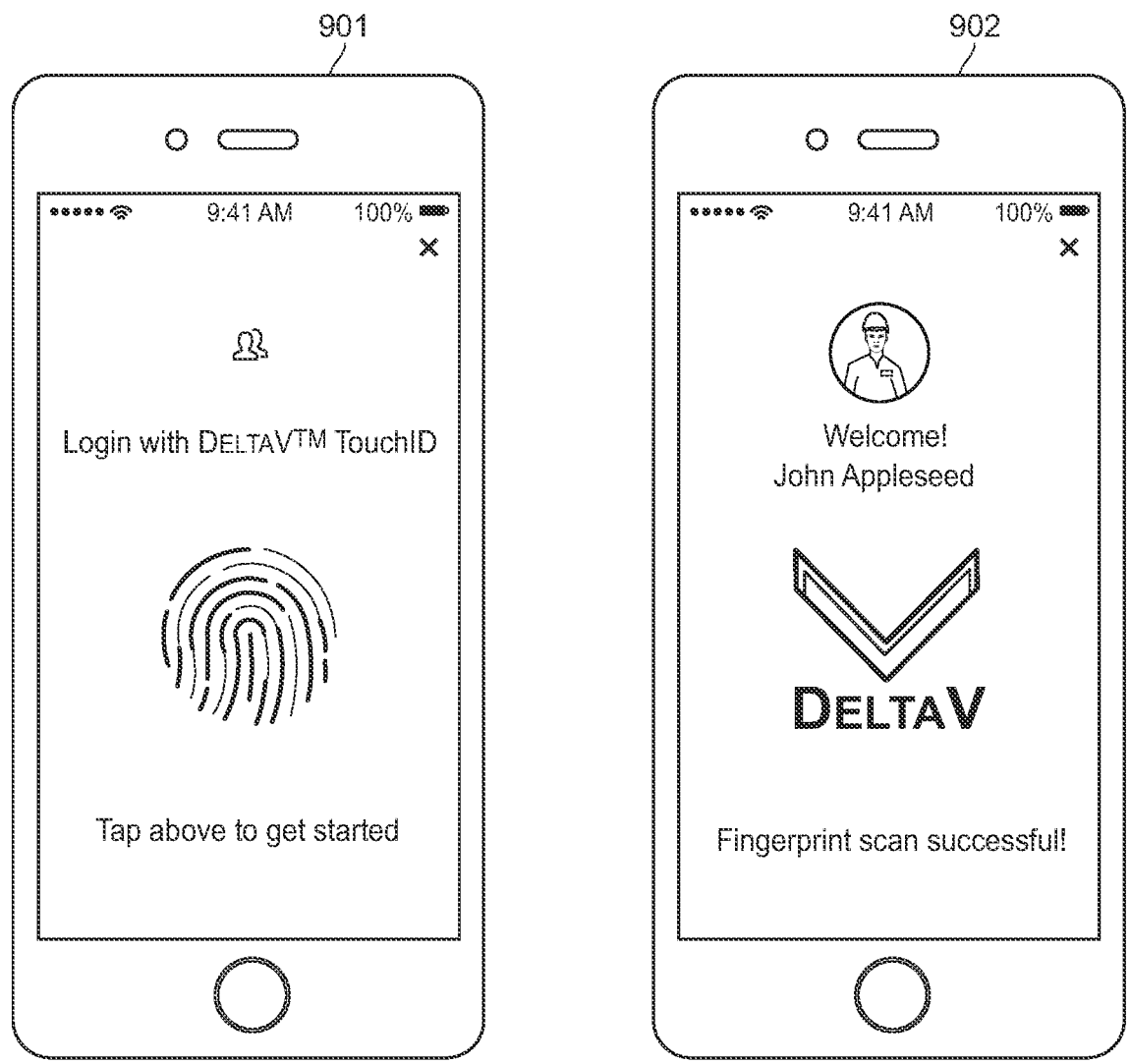
FIG. 9 illustrates a mobile or remote device screen for performing remote verifications in accordance with an embodiment.

FIG. 9 illustrates mobile system interfaces 901 and 902 of a verifier such as a supervisor. These interfaces may be displayed, for example, in mobile devices 641-642 of FIG. 6. In a situation where the supervisor is located remotely from the process plant, the described system may enable the remote supervisor to biometrically confirm an operator write command by, for example, using a biometric finger print scan. FIG. 901 illustrates a GUI prompting a verifier to submit to a fingerprint scan. The scanned fingerprint may then be sent to a plant's SVC for authentication and if successful the operator application may be opened for access as shown in 902. The remote supervisor may be connected to a process control system via a cloud service 645 and connect to the SVC 630 as illustrated in FIG. 6. Intercepted write commands may cause prompts as discussed above to display on the mobile interfaces (not shown). A biometric fingerprint authentication of the supervisor may allow the user to provide signatures for various write commands from operators on the supervisor's team, based on relationship identifiers.

In an embodiment, the biometric approval process may be recorded in a database of runtime changes. This database may be called an event chronicle that captures changes made to plant devices such as field devices and include resulting operational changes. The event chronicle may contain records including at least some of the following fields: first user ID, second user ID, device ID, parameter name, parameter value change, effects of the parameter value change. Biometric input(s) by one or multiple parties may be recorded in such a database (e.g., via the first and second user ID parameters) for back tracing changes to a device or device parameter that affects a plant process in a particular way. By recording the identifiers of both confirmer and verifier, responsible parties may be identified and interviewed for additional information. Additionally, in an embodiment, the event chronicle may be used to provide information to a verifier upon being prompted to validate a write command. A prior change on a device or process parameter may be queried for presentation to the verifier in a prompt to assist the verifier in determining whether to allow a write command.

In an embodiment, another configuration database called an audit trail may record non-runtime changes to a process control device including recording confirmer and verifier identities for write modifications. This audit trail database may be tasked to record configuration changes to a device and have similar parameters as the event chronicle. The changes may be useful to identify responsible parties when configuration changes need to be rolled back or retracted after a negative impact in operation of the device is observed.

Figure 10:
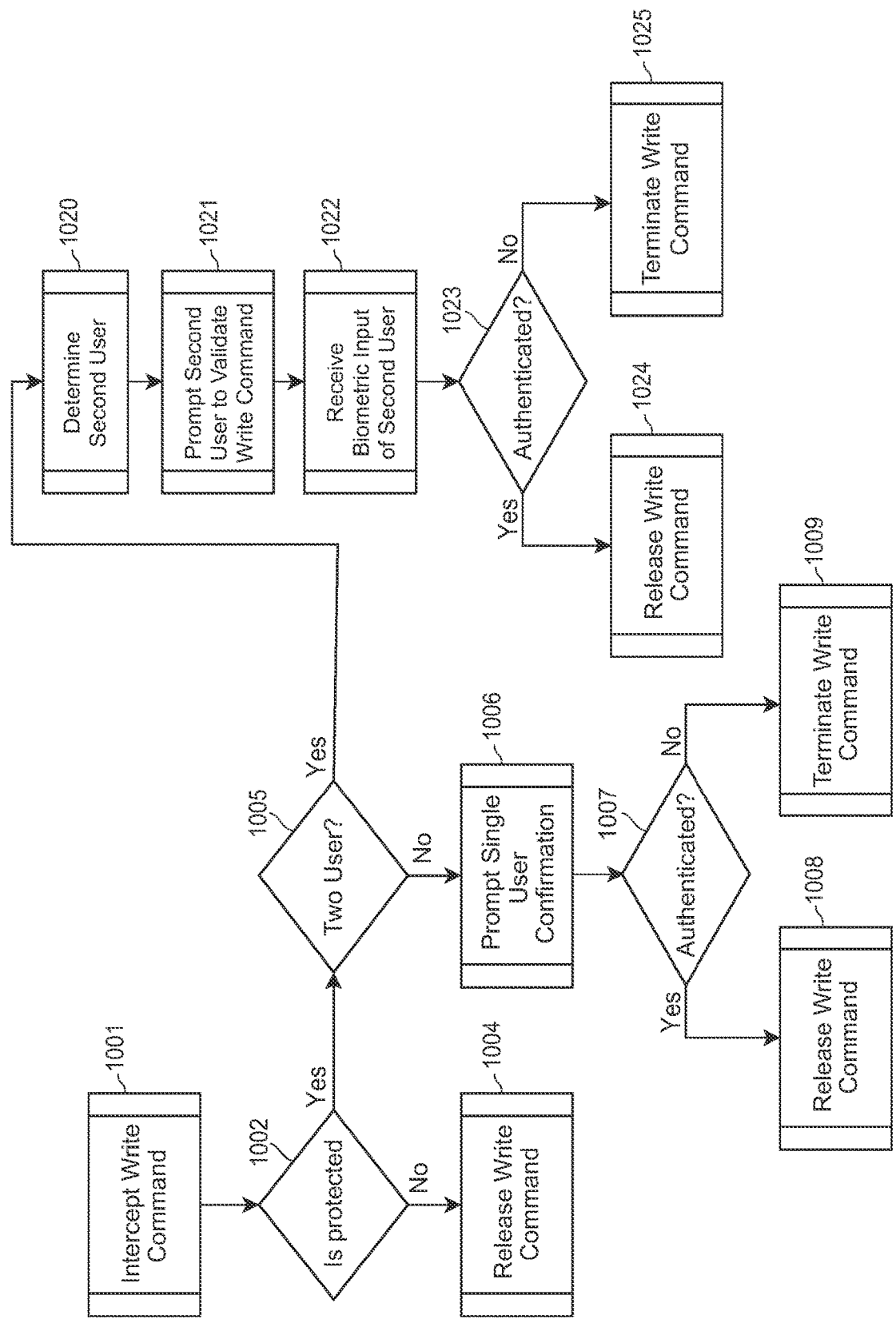
FIG. 10 illustrates a process diagram for implementing a biometric and relationship based security and validation protocol according to an embodiment.

FIG. 10 illustrates a particular process flow that includes determining whether a single user validation or two user validation will be implemented in a security process. At block 1001, a write command may be intercepted by the system. The write command may be intended for a particular device or device parameter. Block 1002 may check the target device or device parameter to determine if it is protected or otherwise has security attributes. If the device or device parameter is unprotected, the write command may be released at block 1004. If the device or device parameter is protected, a check at block 1005 may be made to determine if a relational security process (e.g., a two user validation process) should be executed. If the protected parameter does not need heightened security and validation, a single user confirmation and authentication prompt may be displayed at block 1006. If the confirmation is successful at block 1007, the write command may be released at block 1008, otherwise the write command may be terminated at block 1009.

If a heightened security and validation process is determined at 1005, block 1020 may determine a second user based on relationship information of a first user initiating the write command. The system may prompt the second user at block 1021 to validate the write command. In an embodiment, the system may also query a historical database such as an event chronicle or audit trail database as discussed above and present information on prior changes to the user at block 1021. In an embodiment, the historical information may include identities of previous users or user pairs that were involved in those prior device or device parameter changes. The system may receive a biometric input at block 1022 that serves as a user signature for validating the write command at block 1022. If the biometric input matches a biometric identifier of a second user profile (e.g., the second user is authenticated) at block 1023, the write command may be released at block 1024, otherwise the system may terminate the write command at block 1025.

Figure 11:
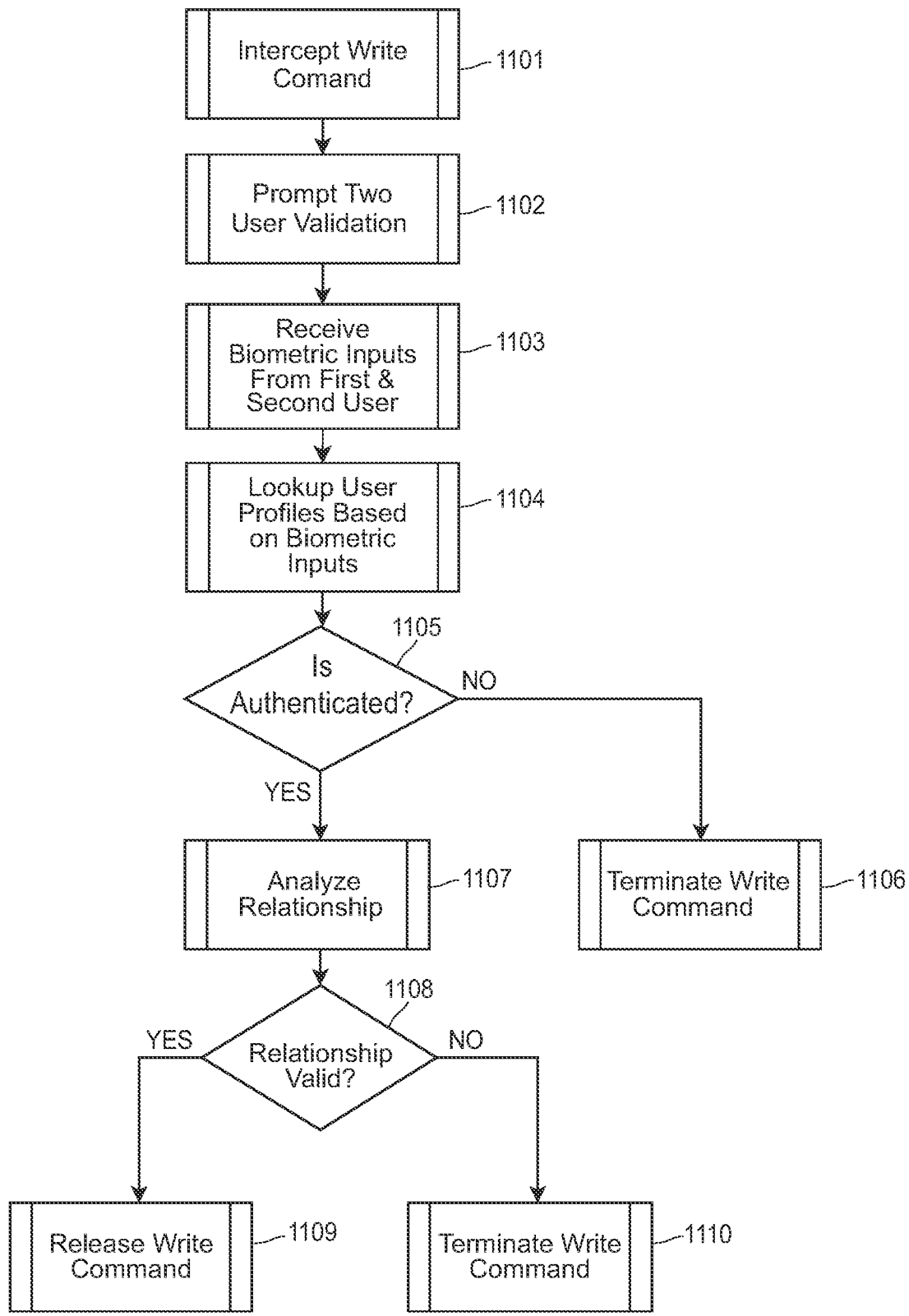
FIG. 11 illustrates an alternative two user validation process according to an embodiment.

FIG. 11 illustrates an alternative two user biometric validation process that includes relationship determinations. At block 1101, a write command may be intercepted. At block 1102, a two user validation prompt may be displayed, such as illustrated in FIG. 4C. The two user validation prompt may be made without an initial search or query to determine a second user. At block 1103 biometric input from the first and the second user may be received. At block 1104, the first and second user profiles may be queried based on the biometric inputs provided at block 1103. If the profiles can be located based on the biometric inputs, authentication of the user may be achieved. If the first user is the user initiating the write command, then the system may already have a user profile of the first user. In this case, the biometric input of the first user further confirms the identity of the first user. Block 1105 may determine if the two users are authenticated based on whether their biometric inputs match user profiles provided, for example by the SVC. If the two users are not biometrically authenticated at block 1105, the intercepted write command may be terminated at block 1106

If both the first and the second user are biometrically authenticated at block 1105, block 1107 may analyze relationship information for the two authenticated users. In an embodiment, a relationship may be determined between the two users if a relationship identifier of the first user references the second user or vice versa. In an embodiment, a valid relationship may be based on whether a protected attribute designates a matching relationship of the first and second user, such as an operator-supervisor relationship. If a valid relationship is found at block 1108, the system and method may release the write command at block 1109, otherwise the write command may be terminated at block 1110.

In some of the embodiments described above, the relationship identifier may be fixed. For example, a relationship may describe a particular link between a superior and a subordinate and remain unchanged during a group or a team operation. In an embodiment, the relationship information contained in a user profile may be altered or modified based on endorsement settings. The endorsement setting or attribute may indicate a user or group that is allowed to change the relationship information or relationship identifiers within the user profiles. In an example, operators may not have any endorsement abilities while supervisors may change their relationship attributes to point to or reference a different supervisor. This may be the case when a supervisor is on leave or otherwise unavailable. In some embodiments, only a project manager has endorsement settings that allow the project manager to alter relationship attributes to point to other users. In some process plants, changing the relationship attribute of a user profile may be done frequently depending on how the plant organizes its teams around tasks or processes. In an embodiment, the relationship identifiers for each user profile may only point one way toward users with higher ranks and higher permission sets.

In an embodiment, the two user validation process may involve a third user, where the third user may provide verification of a write command. In a situation where a second user is unavailable, the method and system may determine a third user based on a relationship identifier of the second user. In direct report systems, where the first user is an operator and the second user is a supervisor, the relationship identifier of the second user may lead to a project manager higher in rank than both the operator and supervisor. This project manager may then be prompted to verify and/or validate the write command.

Referring again to FIG. 6, the security and validation component (SVC) 630 may be adapted to service an engineering application as a workstation application 620 and having a user interface 624. An engineering application may generally be used to configure and install programmed control modules to one or more process controllers or smart field devices (field devices with computing capabilities). The control modules may implement various control loop programs for managing a process variable using a control loop (e.g., a controller and one or more field devices). In some existing systems, security protocols may be applied to discrete control modules where a control module can be locked to prevent unauthorized access and modification. These security protocols may be control module specific and not directly controlled by a network directory service or second party service. In these systems, an engineer may lock the control module using a common user name and password. A problem that may arise from independent lock controls on discrete control modules is that control modules may become locked permanently. This situation may arise if an engineer forgets the username or password. In some circumstances, an engineer may leave the employ of a process plant without unlocking the control module or without leaving a username and password to other engineers or officers of the plant. In this case, the control module may be locked permanently and a new control module may have to be programmed from the beginning, thereby causing a great loss of time and effort.

In an embodiment, process control modules of an engineering application 620 may be designated as a resource, such as a process control device, where the above described method may be similarly applied. A control module may be designated or marked as protected thereby requiring at least a confirmer security process as described above, where engineers needs to authenticate themselves for a modification to the control module. In an embodiment, the relational identifier of the engineer may be used to determine a higher ranking user such as a direct supervisor who can also access and/or unlock the control module. In yet another embodiment, if both the engineer and supervisor are unavailable, a third user identified by the supervisor's relational identifier (e.g., a project manager) may be allowed to access and modify the control module, or otherwise unlock the control module.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., a server, a user interface device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A method of authorizing a write command to a process control device in a distributed process control system (DCS) including at least one controller, one field device, and a workstation communicatively coupled to the at least one controller and one field device comprising:
   intercepting a write command to a process control device issued by a first user;
   determining a second user based on a relationship identifier of the first user when the write command includes a protected attribute having information as to a type of relationship between the first user and the second user for the write command to be released, and wherein the protected attribute identifies a type of relationship that is necessary to write to the protected attribute;
   prompting the second user to validate the write command based on a determination that the write command is to a protected attribute;
   authenticating the second user based on a biometric input of the second user; and
   releasing the write command for execution on the process control device when the write command is determined not to be to a protected attribute or upon determining a match between the biometric input of the second user and a biometric identifier in a profile of the second user.

2. The method of claim 1, wherein determining a second user based on the relationship identifier of the first user includes querying a user manager component for a second user profile based on a relationship identifier of the first user.

3. The method of claim 1, further including querying a user manager component to determine whether the first user has a set of permissions that allows the first user to generate the write command to the process control device; and
   receiving a biometric input of the first user and determining a match between the biometric input of the first user and a biometric identifier in a profile of the first user in a user manager database.

4. The method of claim 1, further including determining whether the write command is for a critical process parameter and intercepting the write command upon determining that the write command is to modify the critical process parameter.

5. The method of claim 1, wherein authenticating the second user includes receiving at a first workstation a biometric input of the second user and transmitting the biometric input of the second user to a second workstation, wherein the biometric input of the second user is checked against a biometric identifier of a user profile of the second user at the second workstation; wherein the first workstation is remote from the second workstation.

6. The method of claim 5, further including authenticating the first user based on a biometric input of the first user, wherein the biometric identifier of a user profile of the first user is checked against the biometric input of the first user.

7. The method of claim 1, further including creating a user manager table of user profiles, wherein each user profile includes a user identifier, a group identifier, a set of permissions, at least one relationship identifier, and a biometric identifier.

8. The method of claim 7, further comprising querying the user manager table for a profile of a third user based on a relationship identifier of the second user and releasing the write command for execution on the process control device upon determining a match between a biometric input of the third user and a biometric identifier in a profile of the third user in the user manager table.

9. The method of claim 7, wherein creating the user manager table includes merging a set of user parameters from an Active Directory database, wherein the set of user parameters from the Active Directory database includes a user identifier, a group identifier, and a set of permissions associated with the group identifier.

10. The method of claim 9, wherein a profile of the second user includes a group identifier indicating membership to a group with a greater permission set than the first user with respect to the process control device.

11. The method of claim 1, further including determining whether the intercepted write command is for a protected device parameter requiring a type of relationship between the first user and the second user.

12. The method of claim 1, further including modifying the reference identifier of the first user to reference a third user different from the second user, wherein the second user and third user belong to a group with a same privilege set.

13. The method of claim 1, further including storing a transaction of the released write command in a historical database, wherein the transaction includes at least a biometric input of the first and second user received for validation of the write command and a date and time of the executed write command.

14. The method of claim 13, further including checking the historical database for a prior transaction involving the first user or the second user and displaying this prior transaction to the second user before authenticating the second user.

15. The method of claim 1, wherein intercepting a write command to a process control device issued by a first user includes intercepting a write command to a process control module of the process control device.

16. A system for authorizing a write command to a process control device in a process control system including at least one controller, one field device, and a workstation communicatively coupled to the at least one controller and one field device comprising:
 a user manager component communicatively coupled to a user manager database and adapted to receive a request for profile information based on an identifier and respond with a user profile including a user identifier, a group identifier, a set of permissions, a biometric identifier, and at least one relationship identifier;
 a workstation adapted to execute a control application for a process control system that receives data from the process control device for display to a user and transmits write commands to the process control device based on inputs received from the user; and
 a security component communicatively coupled to the workstation and user manager component adapted to:
 intercept a write command initiated from the workstation before the write command can be executed by the process control device when the write command includes a protected attribute having information as to a type of relationship between the first user and the second user for the write command to be released, and wherein the protected attribute identifies a type of relationship that is necessary to write to the protected attribute;
 transmit a request to the user manager component for a profile of a second user based on a relationship identifier of the first user;
 prompt the second user to validate the write command based on a determination that the write command is to a protected attribute;
 receive a biometric input of the second user;
 determine whether the biometric input of the second user matches the biometric identifier of the second user profile; and
 release the write command for execution on the process control device when the write command is determined not to be to a protected attribute or upon determining a match between the biometric input of the second user and the biometric identifier in a profile of the second user.

17. The system of claim 16, wherein the security component is further adapted to determine a current device of the second user and transmit a prompt to the current device of the second user, wherein the current device of the second user is different and remote from the workstation.

18. The system of claim 17, wherein the user manager component is further adapted to store information of a current user device.

19. The system of claim 16, further including an active directory database communicatively coupled to the workstation, wherein the user manager database is adapted to join fields from the active directory database to form a user manager table that includes at least a relationship identifier.

20. The system of claim 16, wherein the user manager component is adapted to assign at least one relationship identifier value to each user upon activation of an account of the user, wherein the at least one relationship identifier value references another existing user profile within the user manager database.

21. The system of claim 16, wherein the relationship identifier of the user profile is a biometric identifier of a second user.

22. The system of claim 16, further including an event chronicle database communicatively coupled to the security component and adapted to store the biometric input of the first user, the biometric input of the second user, and parameters of the write command.

23. The system of claim 16, wherein the control application is one of an operator control program adapted to make runtime changes to a process control device or an engineering configuration program adapted to modify a control module for a process controller of the process control system.

24. A method of authorizing a write command to a process control device in a distributed process control system (DCS) including at least one controller, one field device, and a workstation communicatively coupled to the at least one controller and one field device comprising:
 intercepting a write command to a process control device initiated by a first user of a first workstation when the write command includes a protected attribute having information as to a type of relationship between the first user and the second user for the write command to be released, and wherein the protected attribute identifies a type of relationship that is necessary to write to the protected attribute;
 receiving a biometric input of the first user;
 receiving a biometric input of the second user based on a determination that the write command is to a protected attribute;
 authenticating the first and second user based on the biometric input of the first and the second user, respectively;
 determining whether the biometric input of the second user matches a reference identifier of a user profile of the first user; and
 releasing the intercepted write command for execution at the process control device when the write command is determined not to be to a protected attribute or if the first and the second user are authenticated and if the biometric input of the second user matches a reference identifier of the user profile of the first user.

25. The method of claim 24, further including querying a user manager database for a user profile of the second user based on a reference identifier of the user profile of the first user, wherein each user profile in the user manager database includes at least a user identifier, a group identifier, a set of permissions, at least one relationship identifier, and a biometric identifier.

26. The method of claim 24, further including displaying a prompt to validate the write command to both the first user and the second user without displaying the identifiers of the first user or the second user.

* * * * *

UNITED STATES PATENT AND TRADEMARK OFFICE
CERTIFICATE OF CORRECTION

PATENT NO. : 11,658,966 B2
APPLICATION NO. : 16/717586
DATED : May 23, 2023
INVENTOR(S) : Dino Anton Fernandez Yu Page 1 of 1

It is certified that error appears in the above-identified patent and that said Letters Patent is hereby corrected as shown below:

In the Drawings

At Fig. 10, Sheet 12 of 13, and on the Title Page, the illustrative print figure, Tag "1002", Line 1, "Is protected" should be -- Is protected? --.

In the Specification

At Column 3, Line 38, "a" should be -- as --.

At Column 4, Line 40, "log in" should be -- login --.

At Column 4, Line 45, "log in" should be -- login --.

At Column 7, Line 2, "designed for," should be -- designed, --.

At Column 7, Line 32, "applicable" should be -- be applicable --.

At Column 8, Line 41, "581 in" should be -- 581 is --.

At Column 13, Line 38, "submit to" should be -- submit --.

At Column 15, Line 2, "1106" should be -- 1106. --.

Signed and Sealed this
Twentieth Day of January, 2026

John A. Squires
*Director of the United States Patent and Trademark Office*